(12) United States Patent
Takayama

(10) Patent No.: US 11,048,449 B2
(45) Date of Patent: Jun. 29, 2021

(54) INFORMATION PROCESSING APPARATUS, INFORMATION PROCESSING SYSTEM, AND NON-TRANSITORY COMPUTER READABLE MEDIUM FOR RESTRICTING A SIGNALING OPERATION

(71) Applicant: FUJIFILM BUSINESS INNOVATION CORP., Tokyo (JP)

(72) Inventor: Hideaki Takayama, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 63 days.

(21) Appl. No.: 15/788,210

(22) Filed: Oct. 19, 2017

(65) Prior Publication Data

US 2018/0373466 A1    Dec. 27, 2018

(30) Foreign Application Priority Data

Jun. 22, 2017    (JP) .............................. JP2017-122294

(51) Int. Cl.
    *G06F 3/12*          (2006.01)

(52) U.S. Cl.
    CPC ............ *G06F 3/121* (2013.01); *G06F 3/1204* (2013.01); *G06F 3/1222* (2013.01); *G06F 3/1237* (2013.01); *G06F 3/1239* (2013.01); *G06F 3/1285* (2013.01); *G06F 3/1286* (2013.01); *G06F 3/1238* (2013.01)

(58) Field of Classification Search
None
See application file for complete search history.

(56) References Cited

U.S. PATENT DOCUMENTS

| | | | |
|---|---|---|---|
| 9,678,692 B2 | 6/2017 | Iwase | |
| 2006/0290680 A1* | 12/2006 | Tanaka | H04N 1/32523 345/173 |
| 2016/0070510 A1* | 3/2016 | Iwase | G06F 3/1238 358/1.14 |

FOREIGN PATENT DOCUMENTS

| | | |
|---|---|---|
| JP | H-05122424 A | 5/1993 |
| JP | 2013-015774 A | 1/2013 |
| JP | 2016-058778 A | 4/2016 |

OTHER PUBLICATIONS

Mar. 16, 2021 Office Action issued in Japanese Patent Application No. 2017-122294.

* cited by examiner

*Primary Examiner* — Andrew H Lam
(74) *Attorney, Agent, or Firm* — Oliff PLC

(57) ABSTRACT

An information processing apparatus includes an acceptor, a signaling unit, an output unit, and a restrictor. The acceptor accepts an instruction request or an output request transmitted from a first terminal apparatus, the instruction request being used to instruct the information processing apparatus to perform a signaling operation, the output request being used to request the information processing apparatus to output information about an operation screen of the information processing apparatus. The signaling unit makes the signaling operation be performed in the information processing apparatus if the instruction request is accepted. The output unit outputs the information about the operation screen of the information processing apparatus to the first terminal apparatus if the output request is accepted. The restrictor restricts the signaling operation if the acceptor accepts the instruction request from a second terminal apparatus while the information about the operation screen is being output to the first terminal apparatus.

14 Claims, 9 Drawing Sheets

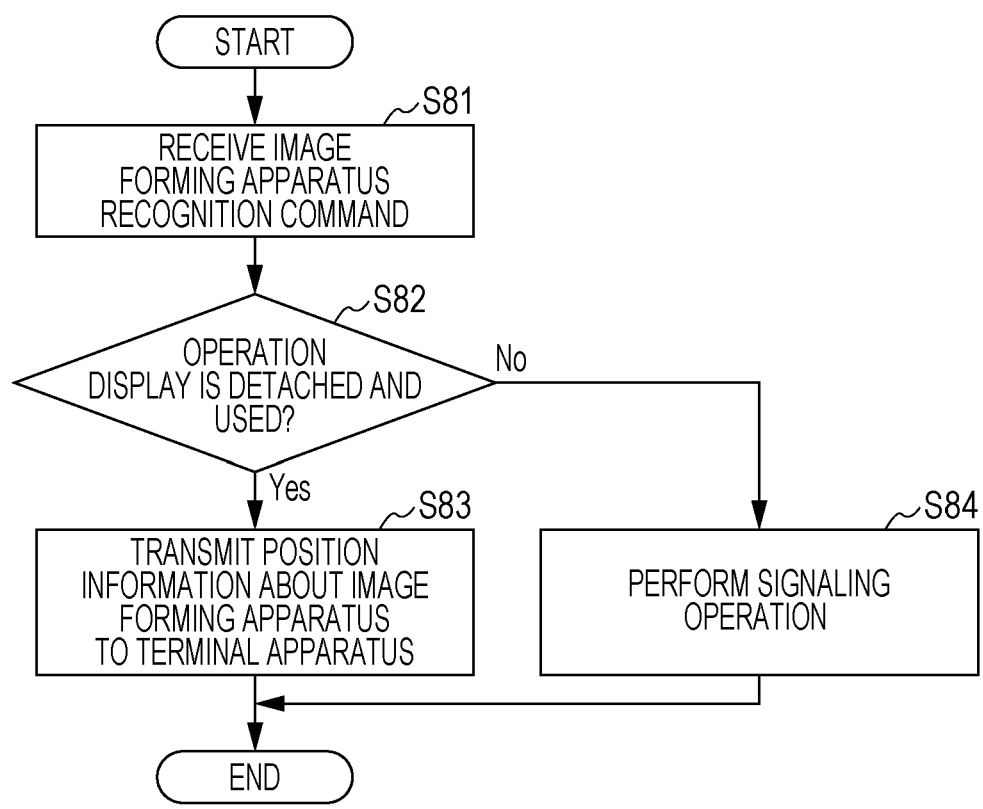

INFORMATION PROCESSING APPARATUS, INFORMATION PROCESSING SYSTEM, AND NON-TRANSITORY COMPUTER READABLE MEDIUM FOR RESTRICTING A SIGNALING OPERATION

CROSS-REFERENCE TO RELATED APPLICATIONS

This application is based on and claims priority under 35 USC 119 from Japanese Patent Application No. 2017-122294 filed Jun. 22, 2017.

BACKGROUND

Technical Field

The present invention relates to an information processing apparatus, an information processing system, and a non-transitory computer readable medium.

SUMMARY

According to an aspect of the invention, there is provided an information processing apparatus including an acceptor, a signaling unit, an output unit, and a restrictor. The acceptor accepts an instruction request or an output request transmitted from a first terminal apparatus, the instruction request being a request used to instruct the information processing apparatus to perform a signaling operation, the output request being a request used to request the information processing apparatus to output information about an operation screen of the information processing apparatus. The signaling unit makes the signaling operation be performed in the information processing apparatus in a case where the acceptor accepts the instruction request. The output unit outputs the information about the operation screen of the information processing apparatus to the first terminal apparatus in a case where the acceptor accepts the output request. The restrictor restricts the signaling operation by the signaling unit in a case where the acceptor accepts the instruction request to the information processing apparatus from a second terminal apparatus while the output unit is outputting the information about the operation screen to the first terminal apparatus.

BRIEF DESCRIPTION OF THE DRAWINGS

Exemplary embodiments of the present invention will be described in detail based on the following figures, wherein:

FIG. 9 is a flowchart illustrating an example operation of the image forming apparatus according to the third exemplary embodiment.

DETAILED DESCRIPTION

Figure 1:
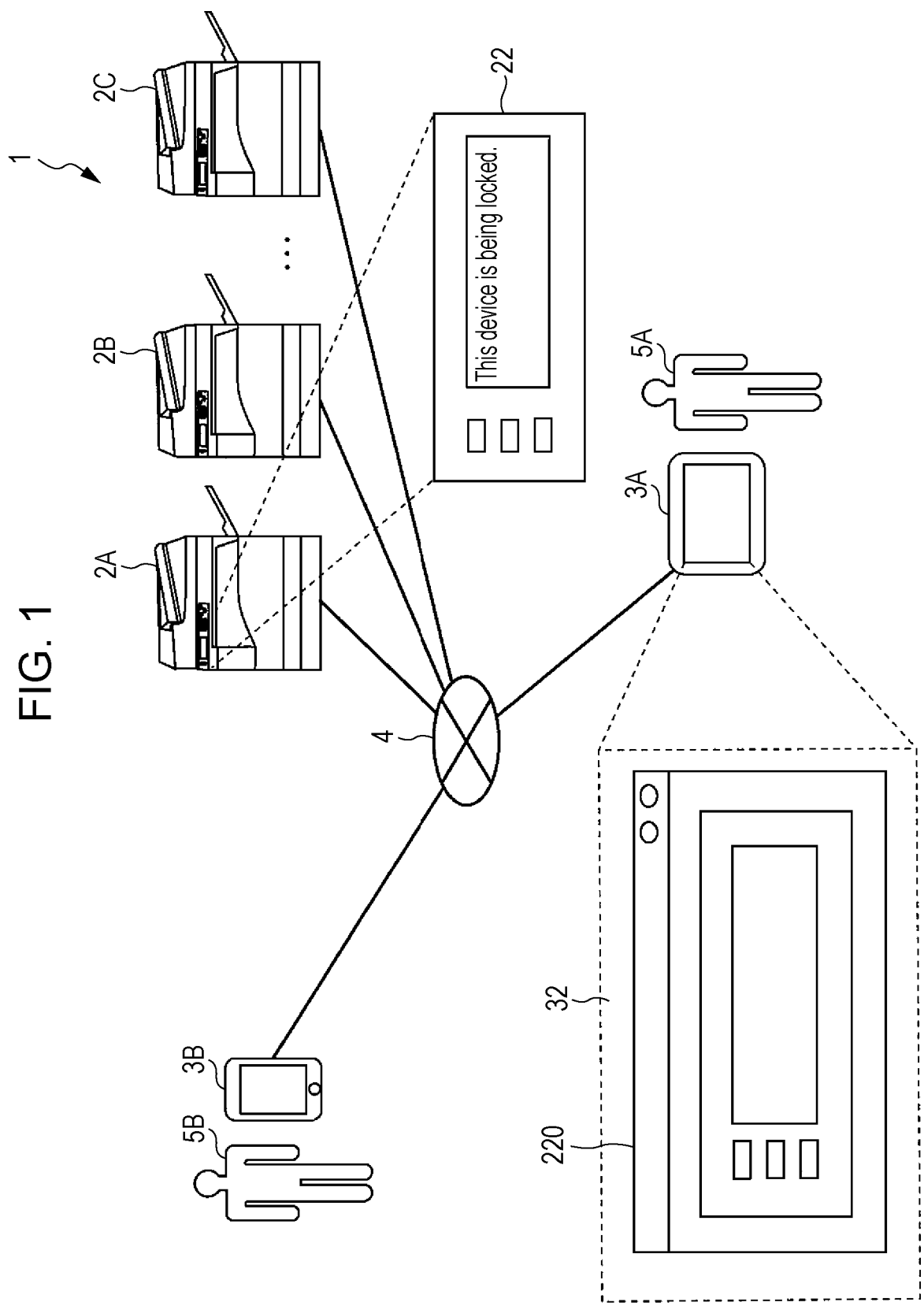
FIG. 1 is a diagram illustrating an example configuration of an image forming system according to a first exemplary embodiment of the present invention.

Hereinafter, exemplary embodiments of the present invention will be described with reference to the drawings. In the figures, constituent elements having substantially the same functions are assigned the same reference numerals, and a duplicated description thereof will be omitted. As an example of the information processing apparatus, an image forming apparatus is described below; however, the information processing apparatus is not limited to an image forming apparatus.

BRIEF DESCRIPTION OF EXEMPLARY EMBODIMENT

An image forming apparatus according to an exemplary embodiment includes an acceptor that accepts an instruction request or an output request transmitted from a first terminal apparatus, the instruction request being a request used to instruct the image forming apparatus to perform a signaling operation, the output request being a request used to request the image forming apparatus to output information about an operation screen of the image forming apparatus; a signaling unit that makes the signaling operation be performed in the image forming apparatus in a case where the acceptor accepts the instruction request; an output unit that outputs the information about the operation screen of the image forming apparatus to the first terminal apparatus in a case where the acceptor accepts the output request; and a restrictor that restricts the signaling operation by the signaling unit in a case where the acceptor accepts the instruction request to the image forming apparatus from a second terminal apparatus while the output unit is outputting the information about the operation screen to the first terminal apparatus.

The operation of "restricting a signaling operation" includes both an operation of prohibiting a signaling operation and an operation of suppressing a signaling operation. The operation of suppressing a signaling operation is, if the signaling operation is performed by, for example, using a sound, an operation of turning down the volume.

First Exemplary Embodiment

FIG. 1 is a diagram illustrating an example configuration of an image forming system 1 according to a first exemplary embodiment of the present invention. FIG. 1 illustrates a state where an operation screen 220 of an image forming apparatus 2A is used by a terminal apparatus 3A through a remote operation. The image forming system 1 illustrated in FIG. 1 is constituted by plural image forming apparatuses 2A, 2B, and 2C and plural terminal apparatuses 3A and 3B connected to the image forming apparatuses 2A, 2B, and 2C via a network 4. Hereinafter, the image forming apparatuses 2A, 2B, and 2C may be collectively referred to as image forming apparatuses 2, and the terminal apparatuses 3A and 3B may be collectively referred to as terminal apparatuses 3. FIG. 1 illustrates an example case where the number of the image forming apparatuses 2 is three, and the number of the terminal apparatuses 3 is two; however, the numbers are not limited to those illustrated in FIG. 1.

Each of the image forming apparatuses 2 is, for example, a multifunction peripheral having plural functions, such as a scan function, a printer function, a copy function, a facsimile function, and an email function.

The terminal apparatuses 3 are operated by users 5A and 5B (hereinafter sometimes collectively referred to as "users 5"). Each of the terminal apparatuses 3 is, for example, a personal computer, a tablet terminal, or a multifunction portable phone (smartphone). Each of the users 5 is an example of a user.

The terminal apparatuses 3 transmit various commands including an image forming apparatus recognition command and a remote operation command to the image forming apparatuses 2. The image forming apparatus recognition command is an example of an instruction request used to give an instruction for a signaling operation. The remote operation command is an example of an output request.

The network 4 is, for example, a local area network (LAN), the Internet, or an intranet and may be a wired network or a wireless network.

Configuration of Image Forming Apparatus

Figure 2:
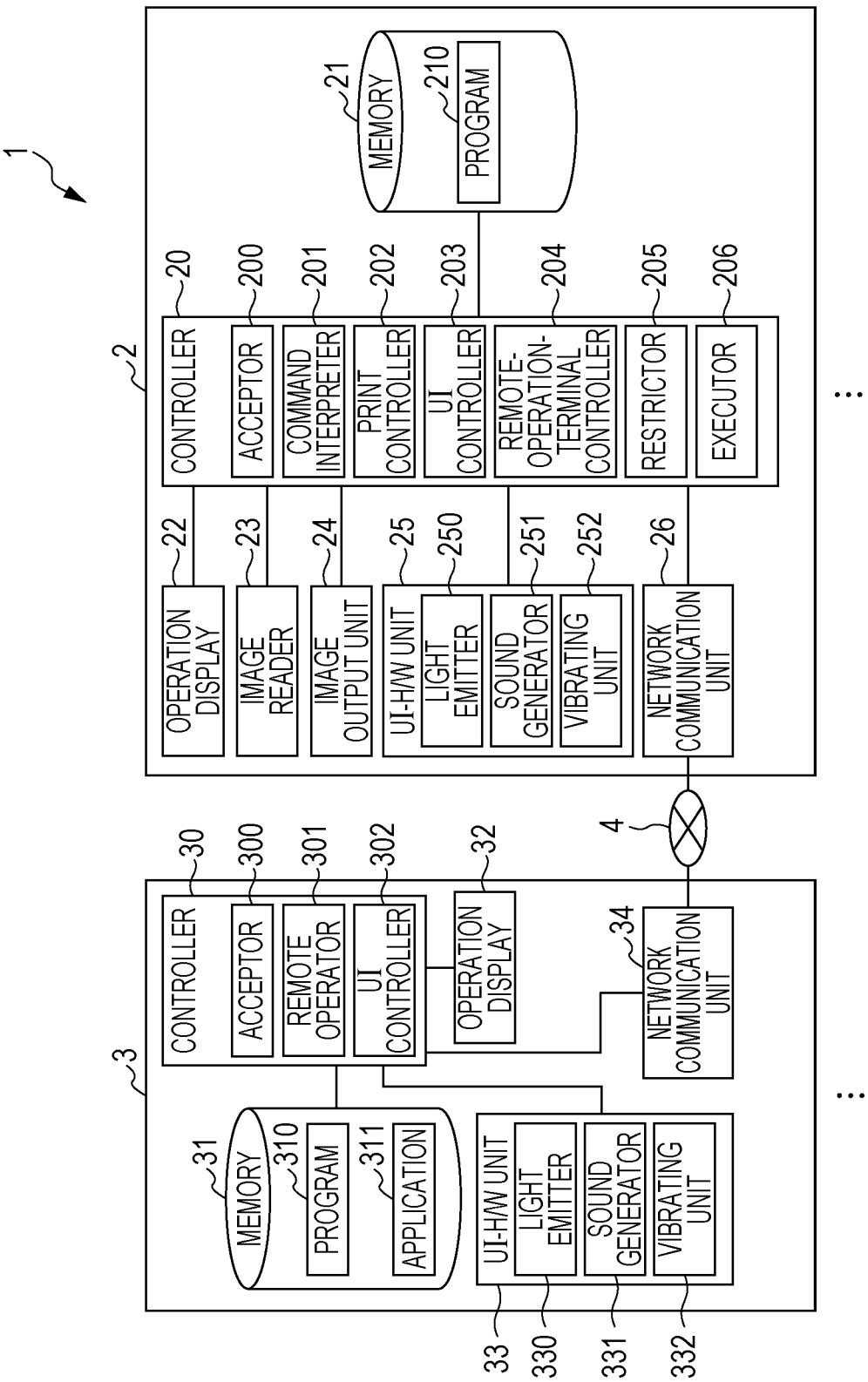
FIG. 2 is a block diagram illustrating an example control system of the image forming system illustrated in FIG. 1.

FIG. 2 is a block diagram illustrating an example control system of the image forming system 1 illustrated in FIG. 1. The image forming apparatus 2 includes a controller 20, a memory 21, an operation display 22, an image reader 23, an image output unit 24, a user interface hardware (UI H/W) unit 25, and a network communication unit 26. The controller 20 controls each unit of the image forming apparatus 2. The memory 21 stores various types of data. The operation display 22 is used to input information and displays information. The image reader 23 reads a document image from a document. The image output unit 24 outputs and prints an image. The UI H/W unit 25 performs a signaling operation. The network communication unit 26 communicates with the terminal apparatus 3 via the network 4.

The controller 20 is constituted by a central processing unit (CPU), an interface, and so on. The CPU operates in accordance with a program 210 stored in the memory 21 to thereby function as an acceptor 200, a command interpreter 201, a print controller 202, a user interface (UI) controller 203, a remote-operation-terminal controller 204, a restrictor 205, an executor 206, and so on. The UI controller 203 is an example of a signaling unit. The remote-operation-terminal controller 204 corresponds to an example of an output unit and an example of a transmitter. The acceptor 200, the command interpreter 201, the print controller 202, the UI controller 203, the remote-operation-terminal controller 204, the restrictor 205, and the executor 206 will be described in detail below.

The memory 21 is constituted by a read-only memory (ROM), a random access memory (RAM), a hard disk, and so on and stores various types of data including the program 210, as illustrated in FIG. 2.

The operation display 22 is, for example, a touch panel display and is constituted by a display, such as a liquid crystal display (LCD), and a touch panel stacked on the display.

The image reader 23 optically reads a document. The image output unit 24 outputs and prints a color image or a monochrome image on a recording medium, such as a sheet, by using, for example, an electrophotographic method or an ink-jet method.

The UI H/W unit 25 includes a light emitter 250 including a light emitting device, such as a light emitting diode (LED), a sound generator 251 including a speaker and so on, and a vibrating unit 252 including a vibrator. The light emitter 250, the sound generator 251, and the vibrating unit 252 each have a driver. The drivers output driving signals to the light emitting device, the speaker, and the vibrator, which are driving targets, on the basis of a signaling operation command to thereby drive the respective driving targets. For example, if plural image forming apparatuses 2 are placed close to each other, it may be difficult for a user to know the position at which the image forming apparatus 2 that the user is intending to use is placed. However, the UI H/W unit 25 performs a signaling operation to thereby let the user know the position of the image forming apparatus 2.

The UI H/W unit 25 is provided in the operation display 22 of the image forming apparatus 2. In the UI H/W unit 25, part or all of, for example, the sound generator 251 may be provided in the vicinity of the operation display 22 or at a position apart from the operation display 22. The UI H/W unit 25 is an example of a signaling operation executor.

The acceptor 200 accepts various commands transmitted from the terminal apparatus 3. Examples of commands accepted by the acceptor 200 include:

(a) an image forming apparatus recognition command;
(b) a command (hereinafter also referred to as a "remote operation command") used to request information about an operation screen (hereinafter also referred to as "screen information"); and
(c) a print command.

The image forming apparatus recognition command is a command used by the user 5 to request the image forming apparatus 2 to perform a signaling operation. The image forming apparatus recognition command is a command signal used to request identification of the image forming apparatus 2 by, for example, emitting light, generating a sound, displaying a display target on an operation screen, or a combination thereof. The image forming apparatus recognition command includes, for example, information about an output destination of the signaling operation (such as an IP address or a user name).

The remote operation command is a command that is transmitted to the image forming apparatus 2 from the terminal apparatus 3 by an operation of the user 5 and is used to request screen information.

The print command is a command used to request the image output unit 24 to perform printing. The print command includes print instruction information, such as print data (image data) and print conditions.

The command interpreter 201 interprets a command accepted by the acceptor 200 and instructs a corresponding unit to perform an operation corresponding to the type of the command.

The print controller 202 controls, in a case where a command accepted by the acceptor 200 is a print command, the image output unit 24 to perform a print process in accordance with print data (image data) and print conditions included in the print command.

The UI controller 203 controls performing of a signaling operation. That is, in a case where a command accepted by the acceptor 200 is an image forming apparatus recognition command, the UI controller 203 generates and transmits, to the UI H/W unit 25, a signaling operation command used to instruct the UI H/W unit 25 to perform a signaling operation. The drivers of the UI H/W unit 25 output driving signals to the driving targets on the basis of the signaling operation command to perform a signaling operation.

The remote-operation-terminal controller 204 transmits various types of information to the terminal apparatus 3. For example, in a case where a command accepted by the acceptor 200 is a remote operation command, the remote-operation-terminal controller 204 transmits screen information about the operation screen 220 to the terminal apparatus 3 that is a remote operation terminal remotely operating the image forming apparatus 2.

The UI controller 203 performs control to display, on the operation display 22 of the image forming apparatus 2, a message indicating that the image forming apparatus 2 is currently being remotely operated after screen information has been transmitted to the terminal apparatus 3 by the remote-operation-terminal controller 204.

The UI controller 203 performs control to restrict input from the operation display 22 of the image forming apparatus 2 (hereinafter also referred to as "device locking"). In this case, the UI controller 203 may perform control to display a message indicating that the device is being locked (see FIG. 1) together with the above-described message indicating that the image forming apparatus 2 is being remotely operated or without displaying the message indicating that the image forming apparatus 2 is being remotely operated.

The restrictor 205 restricts control of performing of a signaling operation by the UI controller 203 after screen information has been transmitted to the terminal apparatus 3 by the remote-operation-terminal controller 204. That is, the restrictor 205 puts a restriction so as not to transmit a signaling operation command generated by the UI controller 203 to the terminal apparatus 3. The restrictor 205 may restrict generation of a signaling operation command by the UI controller 203.

The executor 206 executes a function selected by a user on a menu screen displayed on the operation display 22.

The network communication unit 26 transmits/receives signals to/from the terminal apparatus 3 via the network 4 and passes a received signal to the command interpreter 201.

Configuration of Terminal Apparatus

As illustrated in FIG. 2, the terminal apparatus 3 includes a controller 30, a memory 31, an operation display 32, a UI H/W unit 33, and a network communication unit 34. The controller 30 controls the terminal apparatus 3. The memory 31 stores various types of data. The operation display 32 is used to input and output information. The UI H/W unit 33 performs a signaling operation. The network communication unit 34 communicates with the image forming apparatus 2 via the network 4.

The controller 30 is constituted by a CPU, an interface, and so on. The CPU operates in accordance with a program 310 stored in the memory 31 to thereby function as an acceptor 300, a remote operator 301, a UI controller 302, and so on. The acceptor 300, the remote operator 301, and the UI controller 302 will be described in detail below.

The memory 31 is constituted by a ROM, a RAM, a hard disk, and so on and stores various types of data including the program 310 and an application 311, as illustrated in FIG. 2.

The application 311 is a program for generating various commands in accordance with, for example, an operation performed by the user 5. Various generated commands are transmitted to the image forming apparatus 2 by the network communication unit 34 via the network 4.

Figure 3:
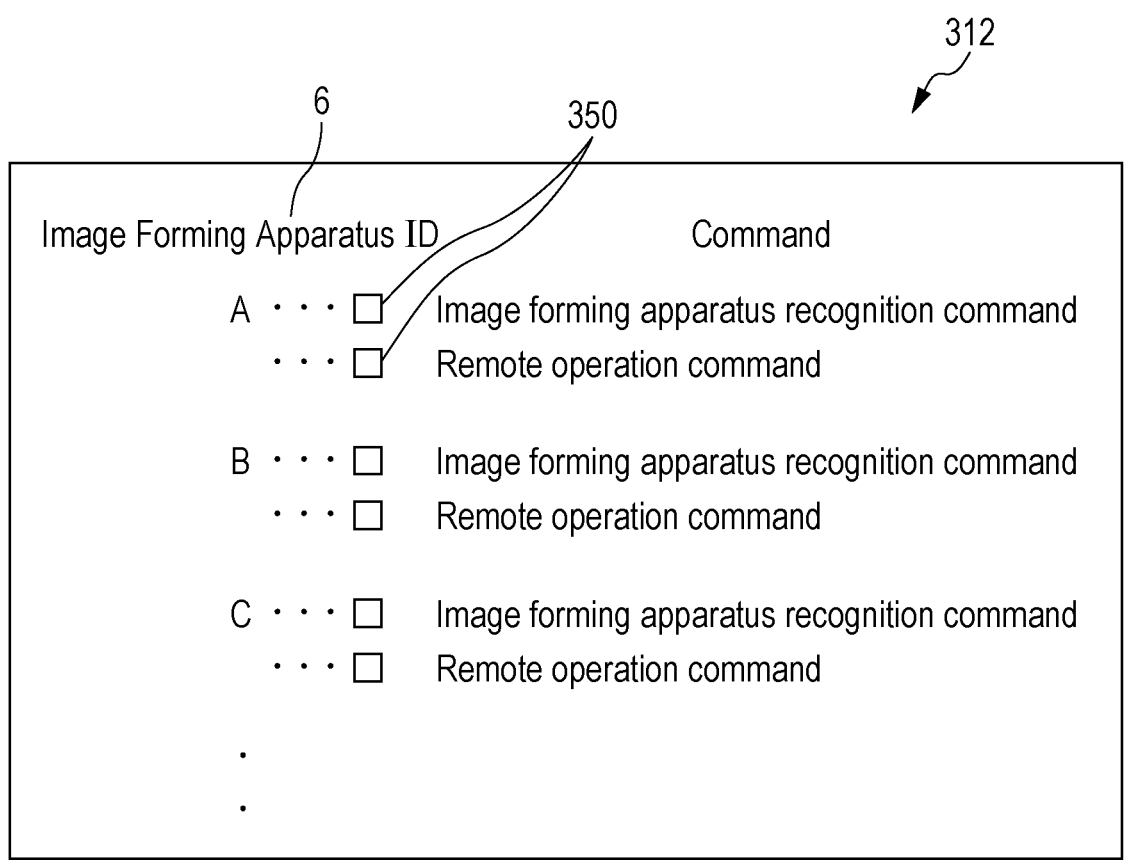
FIG. 3 is a diagram illustrating an example command generation screen.

FIG. 3 is a diagram illustrating an example command generation screen. On a command generation screen 312, for example, a list including the image forming apparatuses 2A, 2B, and 2C indicated by corresponding image forming apparatus IDs 6 (for example, "A", "B", and "C") are displayed, and operation buttons 350 used to generate an image forming apparatus recognition command and a remote operation command are provided for each of the image forming apparatuses 2A, 2B, and 2C. The operation buttons 350 correspond to an example of the acceptor 300 of the terminal apparatus 3.

The acceptor 300 of the terminal apparatus 3 accepts an operation performed by the user 5 on the operation display 32 of the terminal apparatus 3 and accepts various types of information transmitted from the image forming apparatus 2.

The remote operator 301 generates various commands on the basis of an operation accepted by the acceptor 300 of the terminal apparatus 3. The remote operator 301 transmits various generated commands to the image forming apparatus 2.

The UI controller 302 performs control to display content of display on the operation display 32 of the terminal apparatus 3 on the basis of an instruction from the remote-operation-terminal controller 204.

The operation display 32 is, for example, a touch panel display and is constituted by a display, such as an LCD, and a touch panel stacked on the display.

The UI H/W unit 33 includes a light emitter 330 including a light emitting device, a sound generator 331 including a speaker and so on, and a vibrating unit 332 including a vibrator. The light emitter 330, the sound generator 331, and the vibrating unit 332 each have a driver. The drivers output driving signals to the light emitting device, the speaker, and the vibrator, which are driving targets, on the basis of a signaling operation command to thereby drive the respective driving targets.

The network communication unit 34 transmits/receives signals to/from the image forming apparatus 2 via the network 4.

Figure 4:
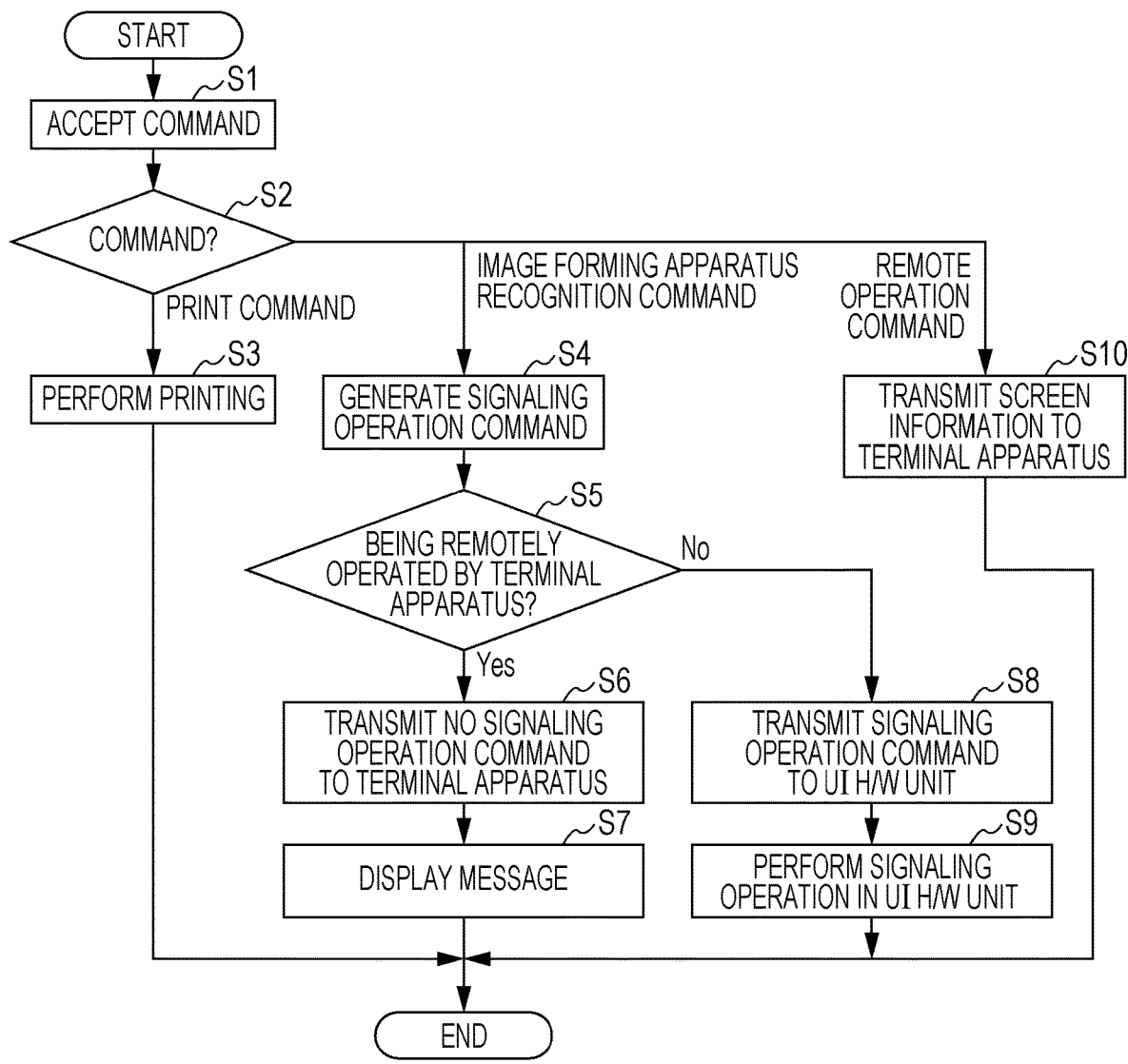
FIG. 4 is a flowchart illustrating an example operation of an image forming apparatus.

Operation According to First Exemplary Embodiment
Operation of Image Forming Apparatus Now, an example operation of the image forming apparatus 2 according to the first exemplary embodiment is described with reference to FIG. 4. FIG. 4 is a flowchart illustrating an example operation of the image forming apparatus 2. The acceptor 200 of the image forming apparatus 2 accepts a command (step S1). Next, the command interpreter 201 interprets the type of the command accepted by the acceptor 200 (step S2).

If the command accepted by the acceptor 200 is a print command (print command in step S2), the print controller 202 performs a print process (step S3).

If the command accepted by the acceptor 200 is an image forming apparatus recognition command (image forming apparatus recognition command in step S2), the UI controller 203 of the image forming apparatus 2 generates a signaling operation command (step S4).

If the image forming apparatus 2 is currently being remotely operated (Yes in step S5), the restrictor 205 performs control so as not to transmit the generated signaling operation command to the terminal apparatus 3 (step S6). The UI controller 203 performs control to display, on the operation display 22 of the image forming apparatus 2, a message indicating that the image forming apparatus 2 is being remotely operated (step S7). The UI controller 203 may perform control to start displaying the above-described message at the time when the image forming apparatus 2 starts being remotely operated regardless of the control by the restrictor 205.

If the image forming apparatus 2 is not being remotely operated (No in step S5), the UI controller 203 transmits the signaling operation command to the UI H/W unit 25 (step S8). Next, the drivers of the UI H/W unit 25 perform a signaling operation in the UI H/W unit 25 of the image forming apparatus 2 on the basis of the signaling operation command (step S9).

If the command accepted by the acceptor 200 is a remote operation command (remote operation command in step S2), the remote-operation-terminal controller 204 transmits screen information to the terminal apparatus 3 that is a remote operation terminal (step S10).

Operation of Terminal Apparatus (1) Operation Based on User Operation

Figure 5A:
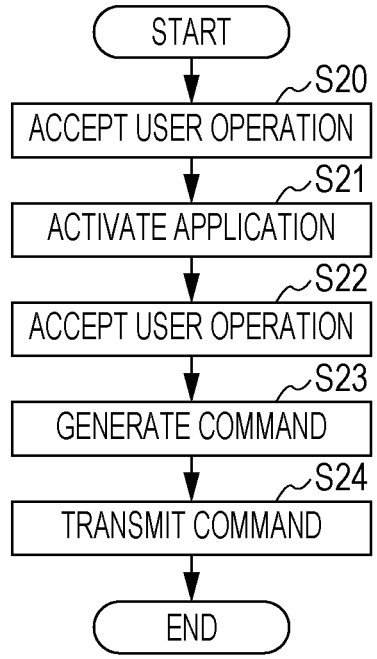
FIGS. 5A and 5B are flowcharts illustrating example operations of a terminal apparatus.
Figure 5B:
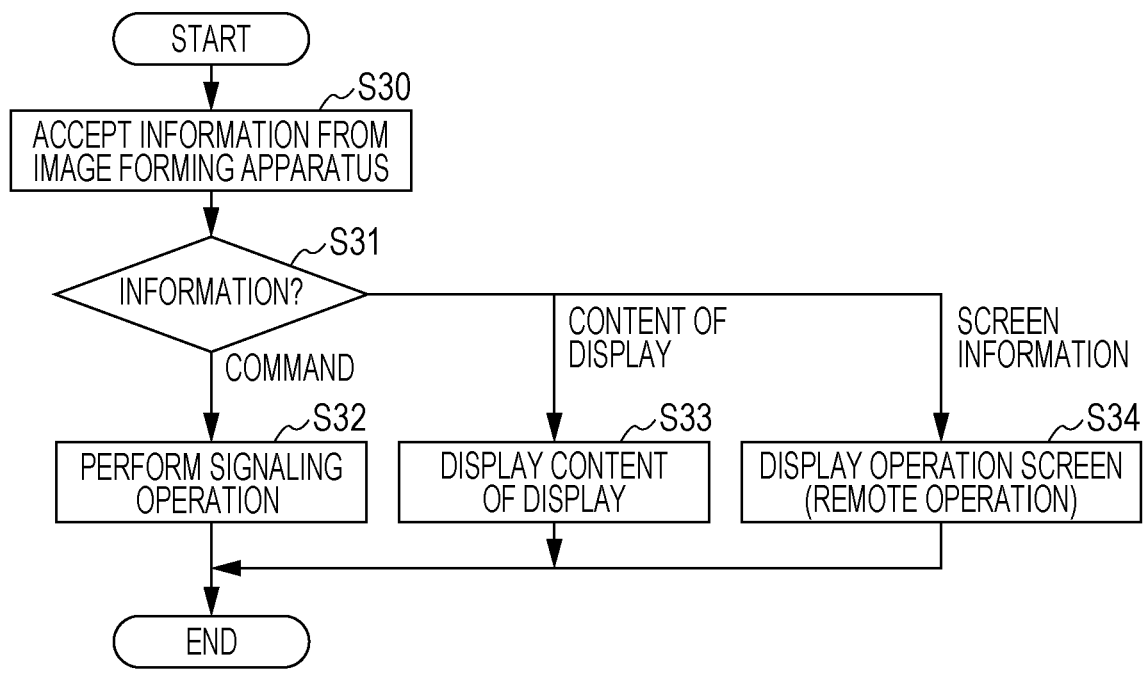

Now, example operations of the terminal apparatus 3 according to the first exemplary embodiment are described with reference to FIGS. 5A and 5B. FIGS. 5A and 5B are flowcharts illustrating example operations of the terminal apparatus 3, where FIG. 5A is a flowchart illustrating an operation based on a user operation and FIG. 5B is a flowchart illustrating an operation based on information from the image forming apparatus 2.

As illustrated in FIG. 5A, the acceptor 300 of the terminal apparatus 3 accepts a user operation performed on the operation display 32 of the terminal apparatus 3 (step S20).

Next, the UI controller 302 of the terminal apparatus 3 activates the application 311 (step S21). The acceptor 300 of the terminal apparatus 3 accepts a user operation performed for the application 311 (step S22).

The remote operator 301 generates a command (for example, an image forming apparatus recognition command, a remote operation command, or a print command) that corresponds to the operation accepted by the acceptor 300 of the terminal apparatus 3 (step S23). The remote operator 301 transmits the generated command to the image forming apparatus 2 via the network communication unit 34 and via the network 4 (step S24).

(2) Operation Based on Information from Image Forming Apparatus

As illustrated in FIG. 5B, the acceptor 300 of the terminal apparatus 3 accepts various types of information transmitted from the image forming apparatus 2 (step S30). If the information accepted by the acceptor 300 of the terminal apparatus 3 contains a command, that is, specifically, if the information accepted by the acceptor 300 of the terminal apparatus 3 is a signaling operation command signal (command in step S31), the UI H/W unit 33 of the terminal apparatus 3 performs a signaling operation (step S32).

If the information accepted by the acceptor 300 of the terminal apparatus 3 is information about content of display (content of display in step S31), the UI controller 302 of the terminal apparatus 3 performs control to display the content of display on the operation display 32 of the terminal apparatus 3 (step S33).

If the information accepted by the acceptor 300 of the terminal apparatus 3 is screen information (screen information in step S31), the UI controller 302 of the terminal apparatus 3 performs control to display an operation screen corresponding to the screen information on the operation display 32 of the terminal apparatus 3 (step S34).

Operation of Image Forming System

Figure 6:
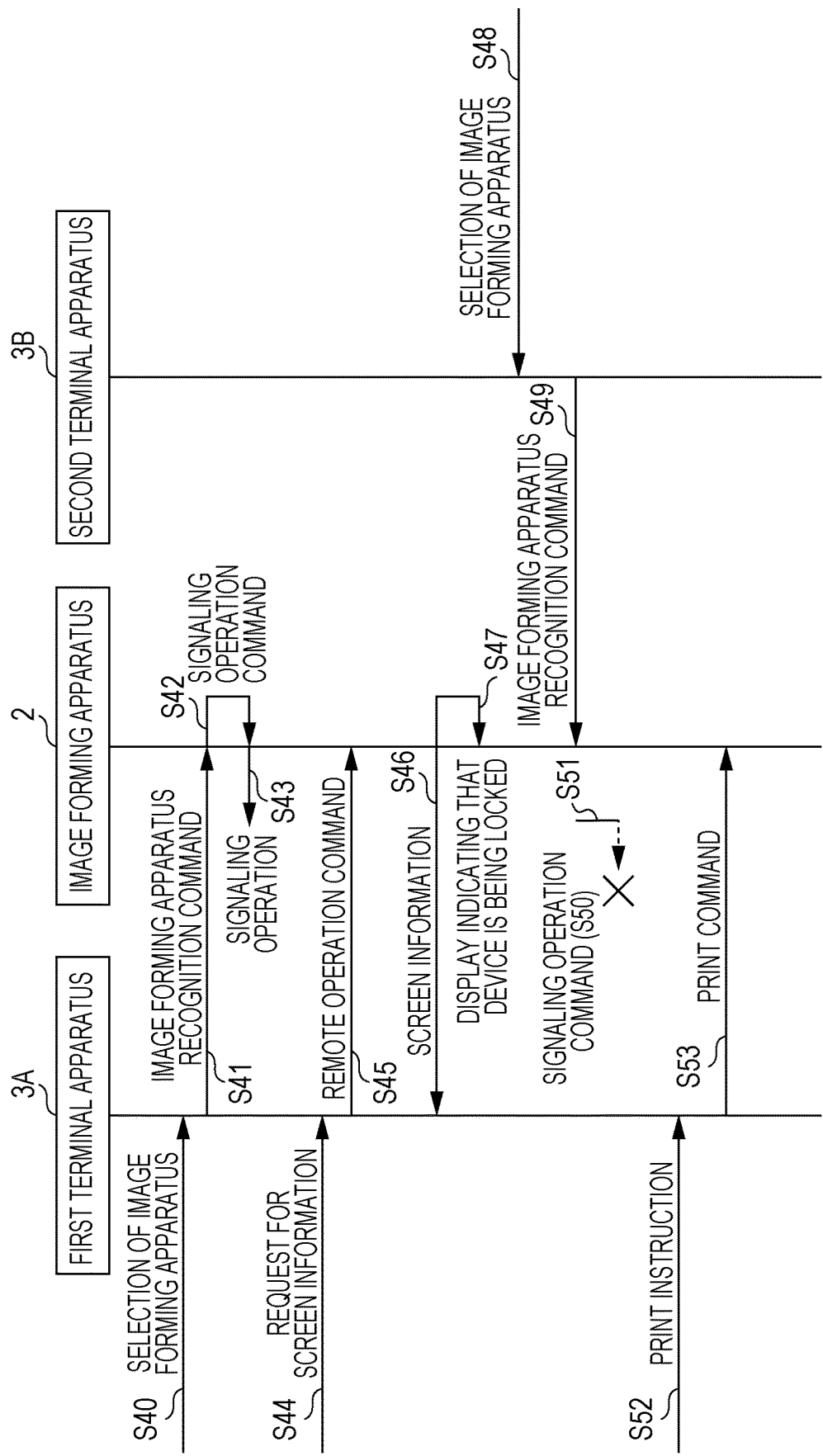
FIG. 6 is a sequence chart illustrating an example operation of the image forming system.

Now, an example operation of the image forming system 1 according to the first exemplary embodiment is described with reference to FIG. 6. FIG. 6 is a sequence chart illustrating an example operation of the image forming system 1. In a description given below, the two terminal apparatuses 3A and 3B (see FIG. 1) are distinguished from each other and respectively referred to as a first terminal apparatus 3A and a second terminal apparatus 3B for convenience of description. Unless otherwise specifically described, the operation described below is performed by the controller 20 of the image forming apparatus 2 and the controller 30 of the terminal apparatuses 3.

On the operation display 32 of the first terminal apparatus 3A, the names of plural image forming apparatuses available to the user 5A are displayed. The user 5A touches one of the names of the image forming apparatuses to select a specific image forming apparatus, which is, for example, the image forming apparatus 2A, as a target to which an instruction for a signaling operation is given (step S40). Then, an image forming apparatus recognition command is transmitted to the image forming apparatus 2A (step S41). Next, a signaling operation command is generated (step S42), and a signaling operation is performed in the image forming apparatus 2A (step S43).

Next, when the first terminal apparatus 3A makes a request for screen information to the specific image forming apparatus, namely, the image forming apparatus 2A (step S44), a remote operation command is transmitted to the image forming apparatus 2A (step S45). Subsequently, screen information is transmitted from the image forming apparatus 2A to the first terminal apparatus 3A (step S46). Subsequently, a message indicating that the device is being locked is displayed on the operation display 22 of the image forming apparatus 2A (step S47).

Next, when the user 5B selects the image forming apparatus 2A as a target to which an instruction for a signaling operation is given for use from the second terminal apparatus 3B (step S48), an image forming apparatus recognition command is transmitted to the image forming apparatus 2A (step S49). Subsequently, a signaling operation command is generated (step S50); however, the generated signaling operation command is not transmitted to the first terminal apparatus 3A due to a restriction put by the restrictor 205 (step S51). Accordingly, the occurrence of a signaling operation in the first terminal apparatus 3A not necessary for the user 5A using the first terminal apparatus 3A is suppressed.

When, for example, the user 5A gives a print instruction to the first terminal apparatus 3A, which is a remote operation terminal (step S52), a print command is transmitted to the image forming apparatus 2A, which is being remotely operated (step S53).

During a period in which the image forming apparatus 2 is being remotely operated, the UI controller 203 of the image forming apparatus 2 may perform a signaling operation in the UI H/W unit 25 of the image forming apparatus 2. As a consequence, even in a case where a signaling operation in the terminal apparatus 3A does not occur due to a restriction put by the restrictor 205 during a period in which the image forming apparatus 2 is being remotely operated, the second user 5B is able to recognize the position of the image forming apparatus 2A by the signaling operation in the image forming apparatus 2A.

Modification

In the first exemplary embodiment, the restrictor 205 is provided in the controller 20 of the image forming apparatus 2 to put a restriction so that the UI controller 203 in the controller 20 of the image forming apparatus 2 does not transmit a signaling operation command to the terminal apparatus 3; however, the restriction is not limited to this. For example, a restrictor may be provided in the controller 30 of the terminal apparatus 3, and the restrictor may put a restriction so that the acceptor 300 of the terminal apparatus 3 does not accept a transmitted signaling operation command. Alternatively, the restrictor in the controller 30 of the terminal apparatus 3 may put a restriction so that the drivers of the UI H/W unit 33 of the terminal apparatus 3 do not output driving signals, that is, a signaling operation in the UI H/W unit 33 of the terminal apparatus 3 is not performed. With the configurations according to the modification, the occurrence of a signaling operation in the first terminal apparatus 3A not necessary for the first user 5A is suppressed.

Second Exemplary Embodiment

Figure 7:
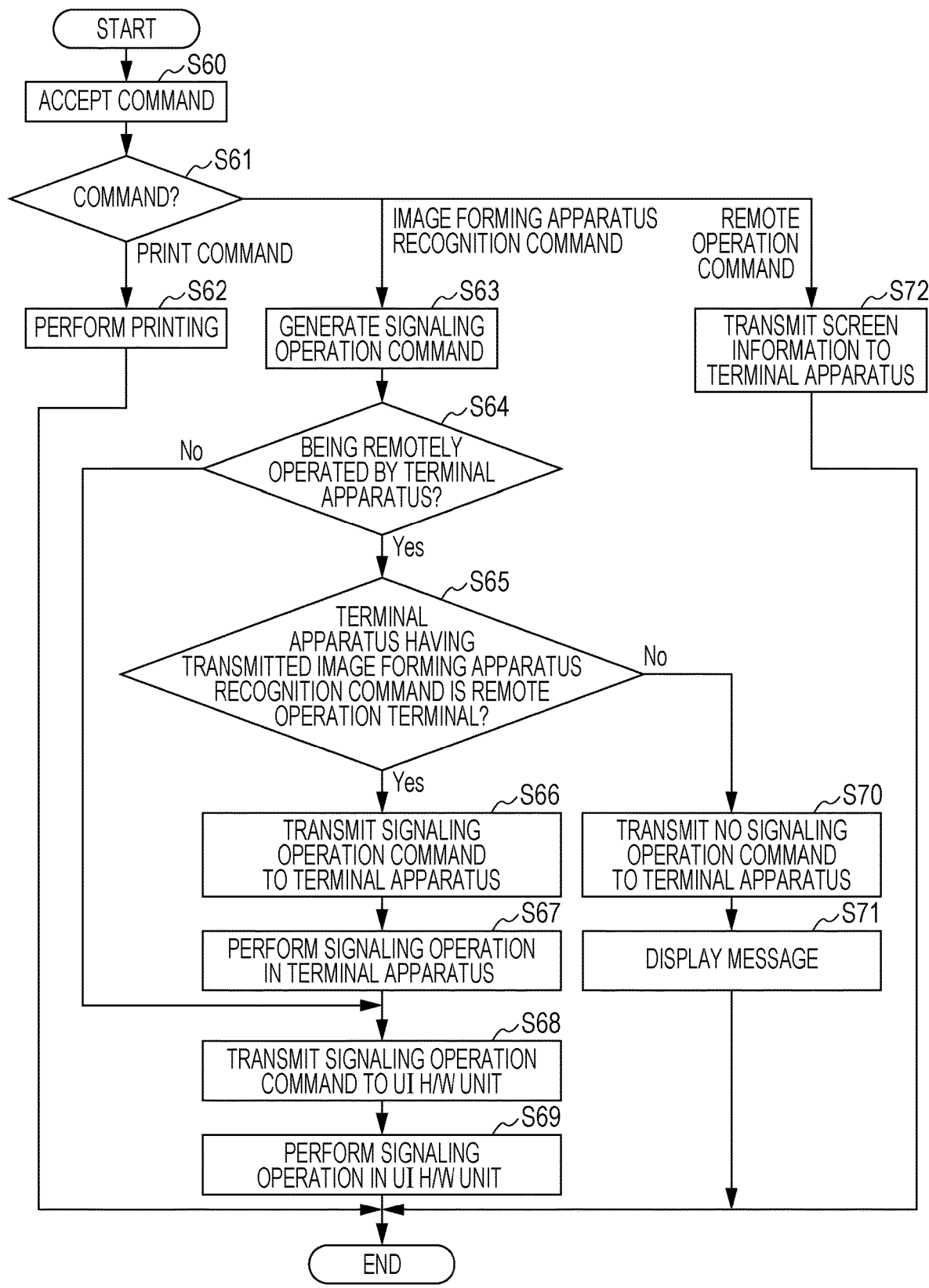
FIG. 7 is a flowchart illustrating an example operation of the image forming apparatus according to a second exemplary embodiment.

FIG. 7 is a flowchart illustrating an example operation of the image forming apparatus 2 according to a second exemplary embodiment. In the first exemplary embodiment, the example has been described in which, during a period in which a specific image forming apparatus 2 is being remotely operated by a terminal apparatus 3, an image forming apparatus recognition command is transmitted from another terminal apparatus 3. In the second exemplary embodiment, an example is described in which an image forming apparatus recognition command is transmitted again to the image forming apparatus 2 from the terminal apparatus 3 that is remotely operating the image forming apparatus 2. A description is given below while focusing on differences from the above-described first exemplary embodiment and the modification.

The operations in steps S60 to S63 and step S72 are similar to the operations in steps S1 to S4 and step S10 of the image forming apparatus 2 according to the first exemplary embodiment. That is, the acceptor 200 accepts a command (step S60). If the command is a print command (print command in step S61), a print process is performed (step S62). If the command is an image forming apparatus recognition command (image forming apparatus recognition command in step S61), a signaling operation command is generated (step S63). If the command is a remote operation command (remote operation command in step S61), screen information is transmitted to the terminal apparatus 3 (step S72).

If the image forming apparatus 2 is currently being remotely operated (Yes in step S64), the restrictor 205 determines whether the terminal apparatus 3 that has transmitted the image forming apparatus recognition command is the terminal apparatus 3 that is a remote operation terminal (step S65). If the terminal apparatus 3 that has transmitted the image forming apparatus recognition command is the terminal apparatus 3 that is a remote operation terminal (Yes in step S65), the remote-operation-terminal controller 204 transmits the signaling operation command to the terminal apparatus 3 that has transmitted the image forming apparatus recognition command (step S66). Next, the drivers of the UI H/W unit 33 perform a signaling operation in the UI H/W unit 33 of the terminal apparatus 3 on the basis of the signaling operation command (step S67).

Next, the UI controller 203 transmits the signaling operation command to the UI H/W unit 25 (step S68). Subsequently, the drivers of the UI H/W unit 25 perform a signaling operation in the UI H/W unit 25 of the image forming apparatus 2 on the basis of the signaling operation command (step S69).

If the terminal apparatus 3 that has transmitted the image forming apparatus recognition command is not the terminal apparatus 3 that is a remote operation terminal (No in step S65), the restrictor 205 performs control so as not to transmit the generated signaling operation command to the terminal apparatus 3 that has transmitted the image forming apparatus recognition command (step S70). The UI controller 203 performs control to display, on the operation display 22 of the image forming apparatus 2, a message indicating that the image forming apparatus 2 is being remotely operated (step S71). The UI controller 203 may perform control to start displaying the above-described message at the time when the image forming apparatus 2 starts being remotely operated regardless of the control by the restrictor 205.

If the image forming apparatus 2 is not being remotely operated (No in step S64), the operations in steps S65, S66, and S67 described above are not performed. That is, a signaling operation in the UI H/W unit 33 of the terminal apparatus 3 is not performed. In this case, the UI controller 203 transmits the signaling operation command to the UI H/W unit 25 (step S68). Next, the drivers of the UI H/W unit 25 perform a signaling operation in the UI H/W unit 25 of the image forming apparatus 2 on the basis of the signaling operation command (step S69).

As described above, in a case where the terminal apparatus 3 that is performing a remote operation is to identify the image forming apparatus 2 that is the remote operation target, a signaling operation is performed in both the image forming apparatus 2 and the terminal apparatus 3. Accordingly, the user is able to identify or find the image forming apparatus 2 that the user is intending to use more easily than in the configuration in which a signaling operation is performed in only the image forming apparatus 2.

Third Exemplary Embodiment

Figure 8:
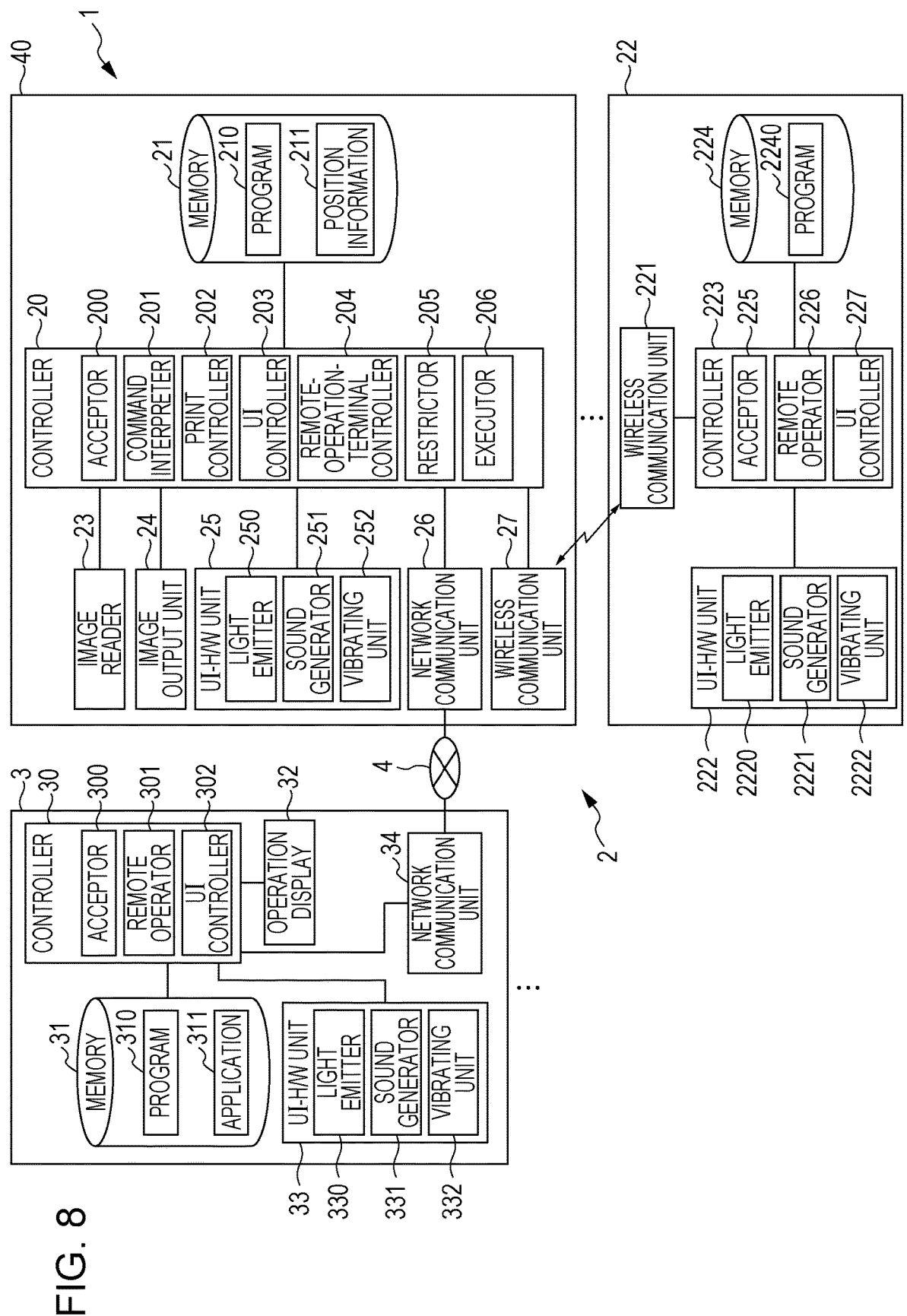
FIG. 8 is a block diagram illustrating an example control system of the image forming system according to a third exemplary embodiment.

FIG. 8 is a block diagram illustrating an example control system of the image forming system 1 according to a third exemplary embodiment. In the first exemplary embodiment described above, the example has been described in which the operation display 22 of the image forming apparatus 2 is fixedly provided in the image forming apparatus 2. In the third exemplary embodiment, an example is described in which the operation display 22 of the image forming apparatus 2 is provided so as to be detachable from a system unit 40 of the image forming apparatus 2 (which is a portion of the image forming apparatus 2 illustrated in FIG. 2 other than the operation display 22). A description is given below while focusing on differences from the above-described first exemplary embodiment.

As illustrated in FIG. 8, the system unit 40 of the image forming apparatus 2 includes the configuration described in the first exemplary embodiment and a wireless communication unit 27. The wireless communication unit 27 transmits/receives signals to/from the operation display 22 that is detached by using, for example, Wi-Fi (registered trademark) or Bluetooth (registered trademark). The memory 21 in the system unit 40 of the image forming apparatus 2 stores position information 211 about the image forming apparatus 2 as well as the data described in the first exemplary embodiment. The position information 211 is information about environmental map data indicating a location in, for example, an office or a public facility, at which the image forming apparatus 2 is placed.

The operation display 22 includes a controller 223, a memory 224, a wireless communication unit 221, and a UI H/W unit 222. The controller 223 controls each unit of the operation display 22. The memory 224 stores various types of data. The wireless communication unit 221 transmits/receives signals to/from the system unit 40 by using, for example, Wi-Fi (registered trademark) or Bluetooth (registered trademark).

The controller 223 of the operation display 22 is constituted by a CPU, an interface, and so on. The controller 223 operates in accordance with a program 2240 stored in the memory 224 to thereby function as an acceptor 225, a remote operator 226, a UI controller 227, and so on. The memory 224 is constituted by a ROM, a RAM, a hard disk, and so on and stores various types of data including the program 2240.

The UI H/W unit 222 includes a light emitter 2220 including a light emitting device, a sound generator 2221 including a speaker and so on, and a vibrating unit 2222 including a vibrator. The light emitter 2220, the sound generator 2221, and the vibrating unit 2222 each have a driver. The drivers output driving signals to the light emitting device, the speaker, and the vibrator, which are driving targets, on the basis of a signaling operation command to thereby drive the respective driving targets.

When the operation display 22 is detached from the system unit 40 of the image forming apparatus 2, the operation display 22 operates in a similar manner to the terminal apparatus 3 that is remotely operating the image forming apparatus 2 in the first exemplary embodiment. That is, the acceptor 225 of the operation display 22 accepts an operation performed by the user 5 on the operation display 22. The remote operator 226 of the operation display 22 transmits various commands to the system unit 40 via the wireless communication unit 221 on the basis of operations performed on the operation display 22. The remote operator 226 of the operation display 22 accepts various types of information transmitted from the remote-operation-terminal controller 204. The UI controller 227 controls each unit of the operation display 22 on the basis of information accepted by the acceptor 225 of the operation display 22.

FIG. 9 is a flowchart illustrating an example operation of the image forming apparatus 2 according to the third exemplary embodiment. The image forming apparatus 2 receives an image forming apparatus recognition command transmitted from the terminal apparatus 3 (step S81).

If the image forming apparatus 2 is used with the operation display 22 detached from the image forming apparatus 2 (Yes in step S82), the remote-operation-terminal controller 204 transmits the position information 211 stored in the memory 21 to the terminal apparatus 3 (step S83). The remote operator 301 of the terminal apparatus 3 receives the position information 211 that has been transmitted. The UI controller 302 of the terminal apparatus 3 performs control to display, on the operation display 32 of the terminal apparatus 3, the position information 211 received by the remote operator 301 of the terminal apparatus 3.

In this case, the restrictor 205 performs control to restrict transmission of a signaling operation command to the operation display 22 by the UI controller 203 of the image forming apparatus 2.

The remote-operation-terminal controller 204 may transmit to the terminal apparatus 3 a message indicating that the operation display 22 is detached from the controller 30 and used and that the image forming apparatus 2 is unable to be recognized through a signaling operation in the operation display 22 of the image forming apparatus 2. In this case, the UI controller 302 of the terminal apparatus 3 performs control to display the above-described message on the operation display 32 of the terminal apparatus 3.

If the image forming apparatus 2 is used with the operation display 22 attached to the image forming apparatus (No in step S82), a signaling operation is performed in the UI H/W unit 25 of the image forming apparatus 2 (step S84).

Accordingly, even in the case where the operation display 22 of the image forming apparatus 2 is detached from the system unit 40 and used, other users are able to recognize the position of the image forming apparatus 2.

The exemplary embodiments of the present invention have been described above; however, exemplary embodiments of the present invention are not limited to the above-described exemplary embodiments, and various modifications and implementation may be made without departing from the spirit of the present invention. For example, some of the functions provided in the controller 20 of the image forming apparatus 2 may be migrated to the controller 30 of the terminal apparatus 3, and some of the functions provided in the controller 30 of the terminal apparatus 3 may be migrated to the controller 20 of the image forming apparatus 2.

Part or all of each of the controller 20, the controller 30, and the controller 223 may be constituted by a hardware circuit, such as a reconfigurable circuit (for example, a field-programmable gate array (FPGA)) or an application-specific integrated circuit (ASIC).

Some of the constituent elements in the above-described exemplary embodiments may be omitted or changed without departing from the spirit of the present invention. Further, any step may be, for example, added, deleted, changed, or exchanged in the flows in the above-described exemplary embodiments without departing from the spirit of the present invention. The programs used in the above-described exemplary embodiments may be recorded to a computer-readable recording medium, such as a compact disc read-only memory (CD-ROM) and provided. Further, the programs used in the above-described exemplary embodiments may be stored in an external server, such as a cloud server, and used via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
an acceptor that accepts a command from a first terminal apparatus, the command being an instruction request or an output request, the instruction request being a request used to instruct the information processing apparatus to perform a signaling operation, and the output request being a request used to request the information processing apparatus to output information about an operation screen of the information processing apparatus;
a command interpreter that determines a type of the command accepted by the acceptor;
an output unit, wherein
when the command interpreter determines that the type of the command accepted by the acceptor is the output request, the output unit outputs the information about the operation screen of the information processing apparatus to the first terminal apparatus;
a signaling unit, wherein when the command interpreter determines that the type of the command accepted by the acceptor is the instruction request, and when the output unit is not currently outputting the information about the operation screen to the first terminal apparatus, the signaling unit causes the signaling operation to be performed in the information processing apparatus; and a restrictor, wherein when the output unit is currently outputting the information about the operation screen to the first terminal apparatus, the restrictor determines whether the acceptor has accepted the instruction request from the first terminal apparatus or a second terminal apparatus, when the restrictor determines that the acceptor accepts the instruction request from the first terminal apparatus, the signaling unit causes the signaling operation to be performed in the information processing apparatus, and when the restrictor determines that the acceptor accepts the instruction request from the second terminal apparatus, the restrictor restricts the signaling operation by the signaling unit.

2. The information processing apparatus according to claim 1, wherein the signaling unit makes the signaling operation be performed on the operation screen of the information processing apparatus.

3. The information processing apparatus according to claim 1, wherein the signaling unit makes the signaling operation be further performed on an operation screen of the first terminal apparatus in a case where the acceptor further accepts the instruction request to the information processing apparatus from the first terminal apparatus while the output unit is outputting the information about the operation screen of the information processing apparatus to the first terminal apparatus.

4. The information processing apparatus according to claim 2, wherein the signaling unit makes the signaling operation be further performed on an operation screen of the first terminal apparatus in a case where the acceptor further accepts the instruction request to the information processing apparatus from the first terminal apparatus while the output unit is outputting the information about the operation screen of the information processing apparatus to the first terminal apparatus.

5. The information processing apparatus according to claim 1, further comprising a transmitter that, in a case where an operation display having the operation screen of the information processing apparatus is detached from a system unit of the information processing apparatus and the acceptor accepts the instruction request from the second terminal apparatus, transmits, to the second terminal apparatus, information indicating that the operation display is detached from the system unit.

6. The information processing apparatus according to claim 2, further comprising a transmitter that, in a case where an operation display having the operation screen of the information processing apparatus is detached from a system unit of the information processing apparatus and the acceptor accepts the instruction request from the second terminal apparatus, transmits, to the second terminal apparatus, information indicating that the operation display is detached from the system unit.

7. The information processing apparatus according to claim 3, further comprising a transmitter that, in a case where an operation display having the operation screen of the information processing apparatus is detached from a system unit of the information processing apparatus and the acceptor accepts the instruction request from the second terminal apparatus, transmits, to the second terminal apparatus, information indicating that the operation display is detached from the system unit.

8. The information processing apparatus according to claim 4, further comprising a transmitter that, in a case where an operation display having the operation screen of the information processing apparatus is detached from a system unit of the information processing apparatus and the acceptor accepts the instruction request from the second terminal apparatus, transmits, to the second terminal apparatus, information indicating that the operation display is detached from the system unit.

9. The information processing apparatus according to claim 5, wherein the transmitter transmits position information about the information processing apparatus to the second terminal apparatus.

10. The information processing apparatus according to claim 6, wherein the transmitter transmits position information about the information processing apparatus to the second terminal apparatus.

11. The information processing apparatus according to claim 7, wherein the transmitter transmits position information about the information processing apparatus to the second terminal apparatus.

12. The information processing apparatus according to claim 8, wherein the transmitter transmits position information about the information processing apparatus to the second terminal apparatus.

13. A non-transitory computer readable medium storing a program causing a computer to execute a process for information processing, the process comprising:

accepting a command from a first terminal apparatus, the command being an instruction request or an output request, the instruction request being a request used to instruct an information processing apparatus to perform a signaling operation, and the output request being a request used to request the information processing apparatus to output information about an operation screen of the information processing apparatus;

determining a type of the command accepted by the information processing apparatus;

when a determination is made that the type the command accepted by the information processing apparatus is the output request, outputting the information about the operation screen of the information processing apparatus to the first terminal apparatus;

when the a determination is made that the type of the command accepted by the information processing apparatus is the instruction request, and when the information processing apparatus is not currently outputting the information about the operation screen to the first terminal apparatus, causing the signaling operation to be performed in the information processing apparatus;

when the information processing apparatus is currently outputting the information about the operation screen to the first terminal apparatus, determining whether the information processing apparatus has accepted the instruction request from the first terminal apparatus or a second terminal apparatus;

when a determination is made that the information processing apparatus accepts the instruction request from the first terminal apparatus, causing the signaling operation to be performed in the information processing apparatus, and when a determination is made that the information processing apparatus accepts the instruction request from the second terminal apparatus, the restrictor restricts the signaling operation by the signaling unit.

14. An information processing system comprising:

a first terminal apparatus;

a second terminal apparatus; and an information processing apparatus comprising:

- an acceptor that accepts a command from the first terminal apparatus, the command being an instruction request or an output request, the instruction request being a request used to instruct the information processing apparatus to perform a signaling operation, and the output request being a request used to request the information processing apparatus to output information about an operation screen of the information processing apparatus;
- a command interpreter that determines a type of the command accepted by the acceptor;
- an output unit, wherein
- when the command interpreter determines that the type of the command accepted by the acceptor is the output request, the output unit outputs the information about the operation screen of the information processing apparatus to the first terminal apparatus;
- a signaling unit, wherein when the command interpreter determines that the type of the command accepted by the acceptor is the instruction request, and when the output unit is not currently outputting the information about the operation screen to the first terminal apparatus, the signaling unit causes the signaling operation to be performed in the information processing apparatus; and
- a restrictor, wherein
- when the output unit is currently outputting the information about the operation screen to the first terminal apparatus, the restrictor determines whether the acceptor has accepted the instruction request from the first terminal apparatus or the second terminal apparatus,
- when the restrictor determines that the acceptor accepts the instruction request from the first terminal apparatus, the signaling unit causes the signaling operation to be performed in the information processing apparatus, and
- when the restrictor determines that the acceptor accepts the instruction request from the second terminal apparatus, the restrictor restricts the signaling operation by the signaling unit.

\* \* \* \* \*